United States Patent [19]

Spina

[11] 4,066,967
[45] Jan. 3, 1978

[54] HANGER RADIO

[76] Inventor: John Jerome Spina, 57-30 59th St., Maspeth, N.Y. 11378

[21] Appl. No.: 695,254

[22] Filed: June 11, 1976

[51] Int. Cl.² ............................................. H04B 1/08
[52] U.S. Cl. .................................... 325/310; 312/7 R; 325/361
[58] Field of Search ............... 325/300, 310, 352, 361, 325/372, 496; 312/7 R; D56/4 B; D6/249, 248; 223/85, 88

[56] References Cited

U.S. PATENT DOCUMENTS

| D. 235,885 | 7/1975 | Hustvedt | D29/1 C |
| 2,470,687 | 5/1949 | Cafrella et al. | 325/352 |
| 2,490,563 | 12/1949 | Van Gastle | 325/310 |
| 2,702,604 | 2/1955 | Hocks et al. | 325/361 |

Primary Examiner—Benedict V. Safourek
Assistant Examiner—Marc E. Bookbinder

[57] ABSTRACT

A metal clothes hanger radio receiver having two speakers oppositely directed and the hanger electrically connected.

7 Claims, 3 Drawing Figures

U.S. Patent  Jan. 3, 1978  4,066,967
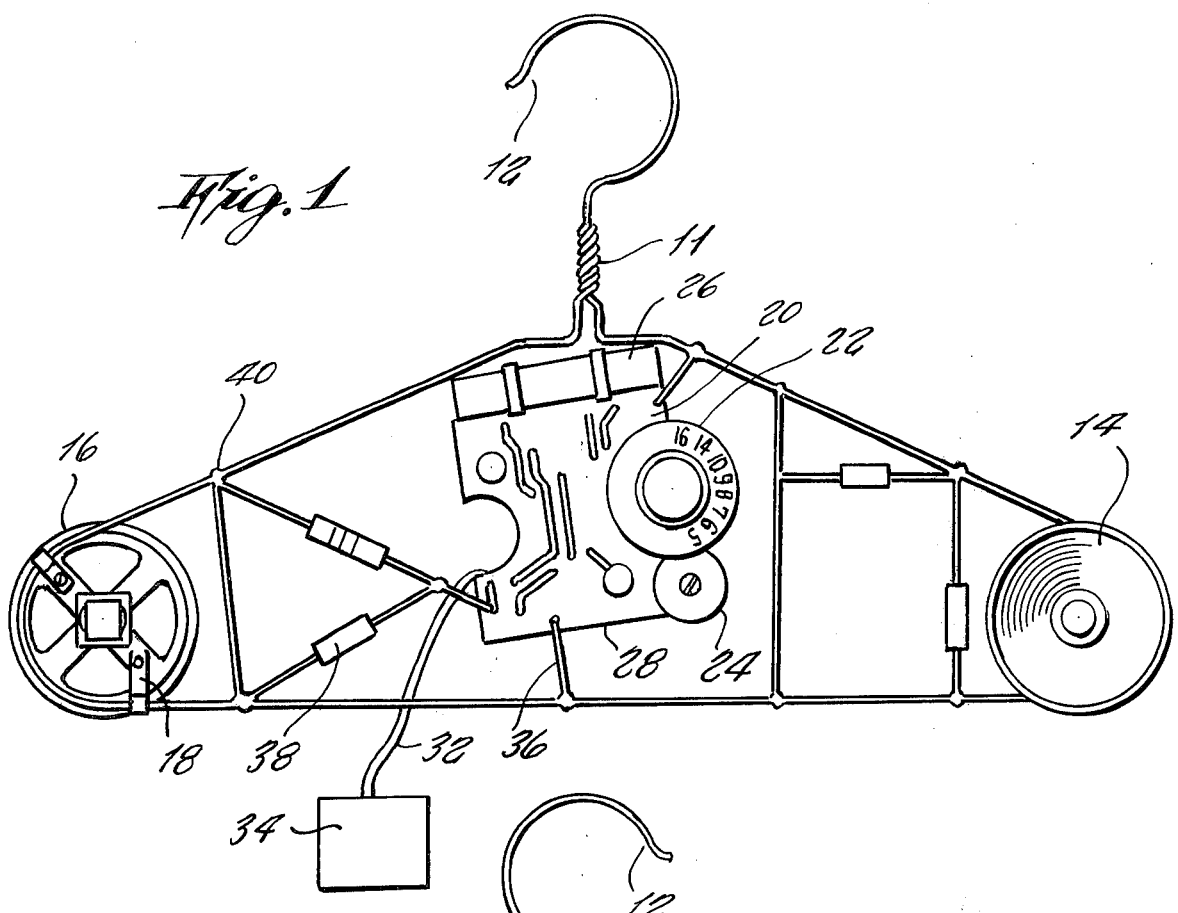
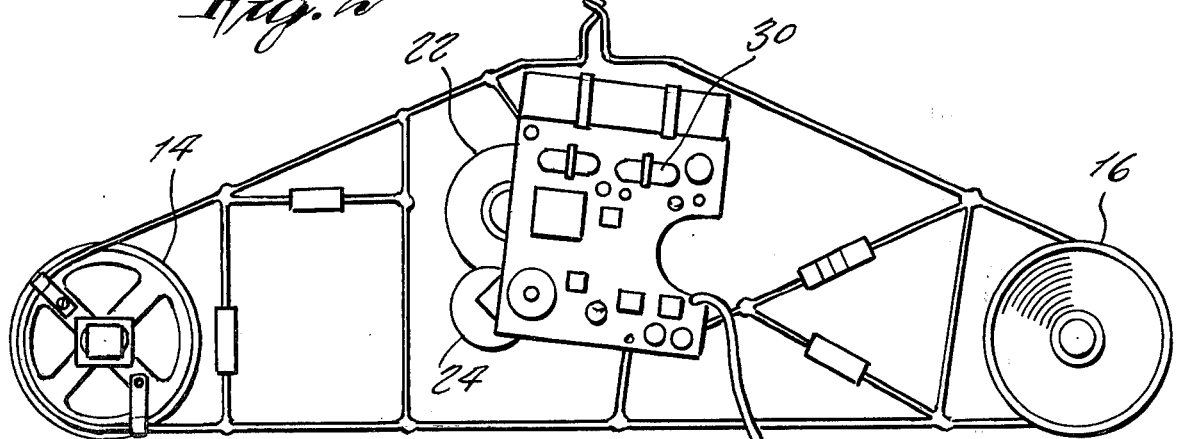
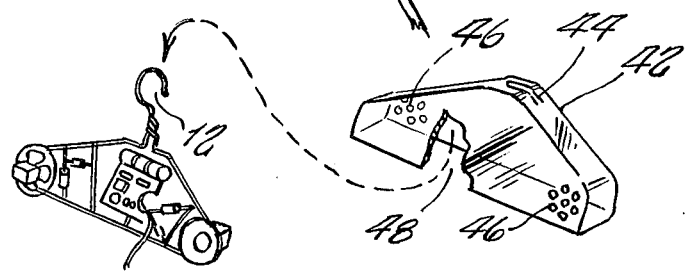

HANGER RADIO

BACKGROUND OF THE INVENTION

Field of the Invention

This invention relates to radios, and, in particular, to radios combined with known objects for a dual purpose.

PRIOR ART

Radios have been known at least since Marconi. Many improvements have been devised over the years. Radio receivers have been combined with various known objects for improved function, for dual function, and for aesthetic advantages.

Francis in U.S. Pat. No. 2,927,995 discloses an antenna in a fishing rod. Of the many other combination radios found in a search of the prior art, none employed the other physical object electrically, but only mechanically as a mounting.

It is obviously an economic advantage to utilize available properties.

SUMMARY

It is therefore an object of this invention to overcome the limitations and disadvantages in the radio devices in the prior art and currently available in the market.

One of the objects of the invention is to provide a hanger radio device embodying improved principles of design and construction.

An important object of the invention is to provide a hanger radio device which is comprised of a number of simple parts and components which can be economically manufactured and readily assembled.

A significant object of the invention is to provide a hanger radio device, so designed and constructed that it can be easily installed in almost any typical environment.

Another object of the invention is to provide a radio wherein the mass and length of hanger metal is utilized electrically to improve the radio's performance.

A further object of the invention is to provide a dual speaker oppositely directed output for a radio.

Yet another object of the invention is to provide a radio with an increased receiving range.

A metal clothes hanger radio receiver, according to the principles of this invention, comprises two speakers oppositely directed and an optical dust cover.

Further objects and advantages of this invention will appear more clearly from the following description of a non-limiting illustrative embodiment and the accompanying drawings in which like numerals designate like parts thruout the several views.

DESCRIPTION OF DRAWINGS

Briefly summarized, a preferred embodiment of the invention is described in conjunction with an illustrative disclosure thereof in the accompanying drawings, in which:

FIG. 1 is a front view representation of the hanger radio constructed according to the principles of this invention.

FIG. 2 is a rear view corresponding to FIG. 1.

FIG. 3 is a pictorial exploded view of the hanger radio and its protective cover.

DESCRIPTION OF TYPICAL EMBODIMENT

In the drawings a hanger radio embodying features of the invention is illustrated comprising a metal clothes hanger 11 which may be hung by hook 12 and which mounts loudspeakers 14, 16 preferably in the extreme corners of the hanger and preferably oppositely directed to create the effect of all-around sound. A typical radio 20 may be used and suitably mounted to the hanger. The radio may be of any available type but the known miniature transistorized radio is preferred both for size and convenience and from a safety and energy point of view since it operates only at low voltage and low current.

The typical radio of that type uses an insulating mounting board 28 to which various components such as electronic circuit members 30, antenna coil 26, selective tuner 22, on-off switch and volume control 24 may be mounted. The radio 20 may be connected by suitable power wires 32 to electrical energy source 34 preferably a battery.

The components may be assembled and mounted to the hanger 11 serving as the main frame by various suitable known methods including clips 18, fasteners such as rivets and eyelets, metal strips 36 fusion attached 40, tape, screws. etc.

The metal hanger being electrically conductive may be used as part of and to extend any of the suitable electrical circuits such as the antenna, the connections to the speakers which may be electrically negative, or other circuits.

Electronic circuit components such as resistors 38 may be added and tuning and range of the radio may be thereby enhanced.

A protective cover 42 may be provided for the hanger radio. The cover should have suitably located openings 44 for the hanger hook, 48 for hanger and radio insertion, and multiple holes 46 opposite the speakers. The cover should be of an insulating material and may be transparent and may easily provide decorative advantages.

The hanger radio may be made of known manufacturing methods of known materials.

From the foregoing, the construction and operation of the device will be readily understood and further explanation is believed superfluous.

The invention includes all novelty residing in the description and drawings. It is obvious to those skilled in the art that various minor changes can be made without departing from the concept of this invention and all such as fall within the reasonable scope of the appended claims are included.

What is claimed is:

1. In combination with a metal clothes hanger, a radio receiver comprising the usually known components including a volume control and a selective tuner, an antenna, and at least one loudspeaker; the metal clothes hanger being suitably electrically connected to the radio receiver, and the loudspeaker being mounted to the clothes hanger.

2. A radio receiver as in claim 1 further comprising two loudspeakers, one mounted at each end of the clothes hanger and oppositely directed.

3. A radio receiver as in claim 1 wherein the metal clothes hanger serves as at least part of the antenna.

4. A radio receiver as in claim 1 wherein the metal clothes hanger serves to electrically connect the loudspeaker to the radio receiver.

5. A radio receiver as in claim 4 wherein the metal clothes hanger has a negative electrical polarity.

6. A radio receiver as in claim 1 further comprising an insulating cover.

7. A radio receiver as in claim 6 wherein the cover is transparent.

* * * * *